A. S. RAMAGE.
PROCESS OF OXIDIZING COMPOUNDS AND PRODUCING TERPENE PEROXID.
APPLICATION FILED MAR. 6, 1906.
1,097,939.
Patented May 26, 1914.
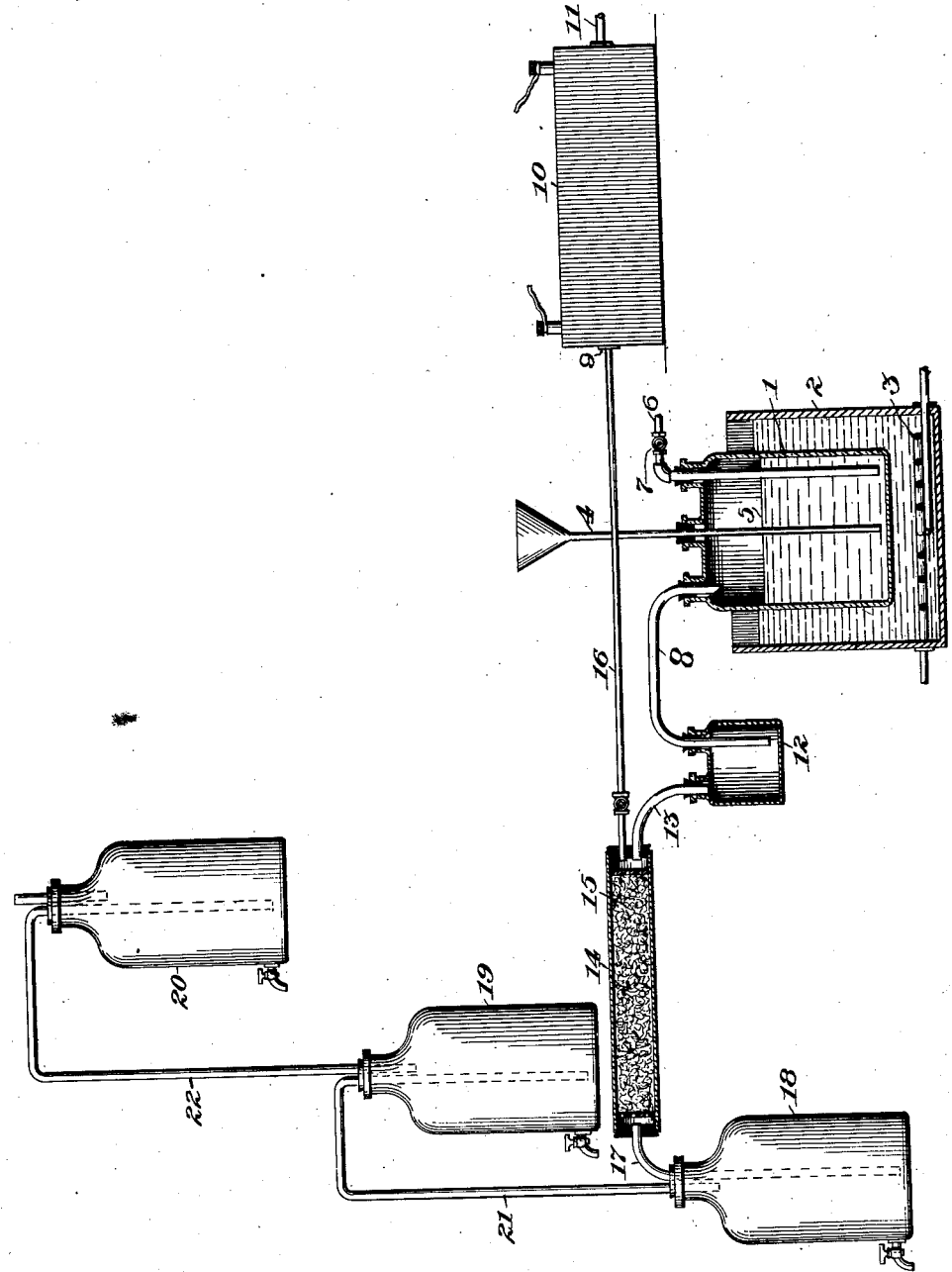

UNITED STATES PATENT OFFICE.

ALEXANDER S. RAMAGE, OF DETROIT, MICHIGAN, ASSIGNOR TO EUGENE A. BYRNES AND CLINTON PAUL TOWNSEND, OF WASHINGTON, DISTRICT OF COLUMBIA.

PROCESS OF OXIDIZING COMPOUNDS AND PRODUCING TERPENE PEROXID.

1,097,939. Specification of Letters Patent. Patented May 26, 1914.

Application filed March 6, 1906. Serial No. 304,587.

*To all whom it may concern:*

Be it known that I, ALEXANDER S. RAMAGE, a citizen of the United States, residing at Detroit, in the county of Wayne and State of Michigan, have invented certain new and useful Improvements in Processes of Oxidizing Compounds and Producing Terpene Peroxid, of which the following is a specification.

In my U. S. Patent 710,893, granted October 7, 1902, I have described and claimed a chemical compound termed terpene peroxid, produced by the oxidation of a terpene compound, such, for instance, as cineol. This compound has heretofore been produced by heating cineol to about 60° C. and causing ozonized air to bubble through it, the peroxid then appearing in dense, white fumes and being condensed and collected as a liquid in a separate vessel. I have now discovered that the oxidation of the terpene hydrocarbon may be effected more rapidly and completely by subjecting the vaporized hydrocarbon to the action of ozone or ozonized air in the presence of a catalytic agent, especially platinum black.

A suitable apparatus for carrying out the process is shown in the accompanying drawing, in which the figure is a longitudinal vertical section showing the ozonizer and collecting vessels in elevation.

The apparatus illustrated comprises a vessel 1 supported in an oil bath 2 heated by a steam coil 3. The vessel 1 has a supply pipe 4 which extends below the surface 5 of the terpene hydrocarbon and preferably to a point near the bottom of the vessel.

6 is an air-inlet pipe communicating with a suitable blower or source of air under pressure, not shown, and having its open end extending to a point near the bottom of the vessel 1; a valve 7 serves to regulate the air supply. The outlet pipe 8 from the vessel 1 opens into a catch-vessel 12 from which a pipe 13 opens into a horizontal chamber 14 containing a catalytic agent 15, preferably platinized asbestos. A pipe 16 leads direct from the discharge aperture 9 of the chamber 10 to the receiving end of the chamber 14. 11 represents the air-inlet to the ozonizer 10. A delivery pipe 17 extends from the other end of this chamber to the first of a series of collecting vessels 18, 19, 20 arranged at successively increasing heights and connected by pipes 21, 22.

In employing this apparatus, the cineol or other liquid to be oxidized is placed in the vessel 1 and air is forced through it by means of the pipe 6. For the oxidation of cineol the liquid in the vessel 1 is preferably heated to a temperature exceeding 100° C., for which purpose a steam pressure of about 100 pounds may be maintained in the coil 3. The vapor of the liquid, together with the particles of liquid mechanically conveyed by the current of air, passes through the catch-vessel 12, where entrained liquid deposits, and thence through the platinized asbestos 15 wherein it is subjected to the action of ozone supplied through the pipe 16. The peroxid fumes or other product pass thence into the vessel 18 where a large proportion is condensed and subsides as a liquid, the remainder being displaced into the collecting vessels above. The liquid product is recovered from the three vessels. It is found that the arrangement of these vessels in cascade materially facilitates the subsidence of the fumes, on account of the height and the cooling effect of the connecting tubes 21, 22 through which the fumes rise.

I claim :—

1. The process of oxidizing liquid compounds, the vapors of which are oxidizable by ozone in the presence of a catalytic agent, which consists in first vaporizing the liquid and then passing the vapor in contact with a catalytic agent and simultaneously subjecting it to the action of ozone, substantially as described.

2. The process of oxidizing liquid organic compounds, the vapors of which are oxidizable by ozone in the presence of a catalytic agent, which consists in first vaporizing the liquid and then passing the vapor in contact with a catalytic agent and simultaneously subjecting it to the action of ozone, substantially as described.

3. The process of oxidizing terpene compounds, which consists in passing the vapor of a terpene in contact with a catalytic agent and simultaneously subjecting it to the action of ozone, substantially as described.

4. The process of oxidizing terpene compounds, which consists in passing the vapor of a terpene in contact with platinized asbestos and simultaneously subjecting it to the action of ozone, substantially as described.

5. The process of oxidizing terpene compounds, which consists in successively vaporizing a terpene by a current of air, and reacting on the mixture of terpene vapor and air with an oxidizing agent, in the presence of a catalytic agent, substantially as described.

6. The process of oxidizing terpene compounds, which consists in successively vaporizing a terpene by a current of air, at a temperature above 100° C., and reacting on the mixture of terpene vapor and air with an oxidizing agent, in the presence of a catalytic agent, substantially as described.

7. The process of oxidizing terpene compounds, which consists in vaporizing a terpene by a current of air, passing the vapor in contact with a catalytic agent, and simultaneously subjecting it to the action of ozone, substantially as described.

8. The process of oxidizing terpene compounds, which consists in vaporizing a terpene by a current of air, at a temperature above 100° C., passing the vapor in contact with a catalytic agent, and simultaneously subjecting it to the action of ozone, substantially as described.

9. The process which consists in oxidizing a terpene and causing the resulting fumes to subside decrementally at successively increasing elevations, substantially as described.

10. The process which consists in oxidizing a terpene by the simultaneous action of a catalytic agent and ozone, and causing the resulting fumes to subside in separate chambers at successively increasing elevations, substantially as described.

In testimony whereof, I affix my signature in presence of two witnesses.

ALEXANDER S. RAMAGE.

Witnesses:
 ALVA L. BUTZ,
 JONATHAN PALMER, Jr.